(12) United States Patent
Wolfer et al.

(10) Patent No.: US 6,387,518 B1
(45) Date of Patent: May 14, 2002

(54) SILICONE RUBBER COMPOSITIONS FOR PRODUCING CABLES OR PROFILES WITH RETENTION OF FUNCTION IN THE EVENT OF FIRE

(75) Inventors: Dietrich Wolfer, Obernodorf (AT); Wilhelm Marsch, Haiming; Peter Gerhardinger, Burghausen, both of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/451,881

(22) Filed: Dec. 1, 1999

(30) Foreign Application Priority Data

Dec. 3, 1998 (DE) .......................... 198 55 912

(51) Int. Cl.[7] .............................. B32B 9/04; C08L 83/04
(52) U.S. Cl. ..................... 428/447; 428/920; 428/921; 524/588; 524/405; 524/430; 524/432; 524/433; 524/436; 524/437; 523/173; 522/99; 106/18.12
(58) Field of Search .................. 524/588, 405, 524/432, 433, 436, 437, 430; 522/99; 523/173; 428/920, 921, 447; 106/18.12

(56) References Cited

U.S. PATENT DOCUMENTS

| 3,711,520 A | * | 1/1973 | Pfeifer et al. |
| 3,839,266 A | * | 10/1974 | Bargain |
| 4,269,757 A | * | 5/1981 | Mine et al. |
| 4,288,360 A | * | 9/1981 | Bobear |
| 4,539,357 A | * | 9/1985 | Bobear ........................ 524/267 |
| 5,057,151 A | | 10/1991 | Schuster et al. |
| 5,139,715 A | * | 8/1992 | Katsuno et al. ............. 264/46.4 |
| 5,179,148 A | * | 1/1993 | Inoue et al. ................. 524/265 |
| 5,260,372 A | * | 11/1993 | Toporcer et al. ............ 524/785 |
| 5,543,450 A | | 8/1996 | Takita et al. |
| 5,597,853 A | * | 1/1997 | Itoh et al. .................... 523/213 |
| 5,866,653 A | * | 2/1999 | Matsushita et al. ......... 524/731 |

FOREIGN PATENT DOCUMENTS

| DE | 2 257 915 | 5/1974 |
| DE | 30 08 084 A1 | 9/1980 |
| DE | 38 39 900 A1 | 5/1990 |
| EP | 0 329 332 A2 | 8/1989 |
| EP | 0 359 251 B1 | 11/1993 |
| EP | 0 801 111 A1 | 10/1997 |
| EP | 0 708 455 B1 | 2/1998 |

OTHER PUBLICATIONS

English Derwent Abstract (AN 1997 359228 [33]) For JP-A-91151324.
English Derwent Abstract For DE 2 257 915.
International Search Report—May 26, 2000.
The English Derwent Abstract 1990–085069 (12) corresponding to EP 0359251 is enclosed.
The English Derwent Abstract 1980–68024C (39) corresponding to De 3008084 is enclosed.
The English Derwent Abstract 1996–202274 (21) corresponding to EP 0708455 is enclosed.

* cited by examiner

Primary Examiner—Robert Dawson
Assistant Examiner—Jeffrey B. Robertson
(74) Attorney, Agent, or Firm—Brooks & Kushman P.C.

(57) ABSTRACT

A composition which is useful for producing profiles and cable insulation which retain their function in the event of fire, comprise peroxidically crosslinking or condensation-crosslinking silicone rubber, metal oxides selected from magnesium oxide, aluminum oxide, tin oxide, calcium oxide and barium oxide and metal compounds of this class which produce oxides on heating, boric acid, zinc borate, and a platinum complex having at least one unsaturated group.

16 Claims, No Drawings

SILICONE RUBBER COMPOSITIONS FOR PRODUCING CABLES OR PROFILES WITH RETENTION OF FUNCTION IN THE EVENT OF FIRE

TECHNICAL FIELD

The invention relates to silicone rubber compositions which may be used to prepare profiles and cable insulation which retain their function in the event of fire, and also to a process for preparation of the same.

BACKGROUND ART

DE-A-30 08 084 discloses ceramifyable silicone compositions which comprise silicone rubber compositions, a ceramifyable filler which may be a metal oxide, and platinum compounds. However, the silicone rubber used in these formulations is an expensive, addition-crosslinking composition which moreover has relatively poor insulation properties at temperatures above 900° C.

EP 0 708 455 discloses peroxidically crosslinkable silicone rubber compositions of high density which comprise ceramifyable fillers such as a metal oxide, for example aluminum oxide, and a wetting agent, and are used as cable insulation material. Compositions of this type form a stable ash layer, but not a hard ceramic material, on combustion in an open flame. This layer falls away from the conductor under impact stress.

DISCLOSURE OF INVENTION

An object of the present invention is to provide a silicone rubber cable insulation material which overcomes the disadvantages of the prior art and, in particular, to provide a cable insulation material which has low density and allows retention of function in the event of fire. A further object is to provide profiles of silicone rubber material which similarly retain their function in the event of fire. These and other objects are achieved by the invention.

BEST MODE FOR CARRYING OUT THE INVENTION

The invention provides a composition comprising peroxidically crosslinkable or condensation-crosslinkable silicone rubber, metal oxides selected from the class consisting of magnesium oxide, aluminum oxide, tin oxide, calcium oxide, titanium oxide and barium oxide and metal compounds of this class which produce oxides on heating, boric acid, zinc borate, and also platinum complexes having at least one unsaturated group.

The novel silicone rubber is preferably a peroxidically crosslinking organopolysiloxane composition, which preferably comprises the following components.

Organopolysiloxanes composed of units of the general formula $$R_r SiO_{\frac{4-r}{2}} \quad (I)$$

where

R may be identical or different and are unsubstituted or substituted hydrocarbon radicals.

r is 0, 1, 2 or 3 and has an average numerical value of from 1.9 to 2.1.

Examples of hydrocarbon radicals R are alkyl radicals such as the methyl, ethyl, n-propyl, isopropyl, n-butyl, isobutyl, tert-butyl, n-pentyl, isopentyl, neopentyl or tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical; cycloalkyl radicals such as cyclopentyl, cyclohexyl and cycloheptyl radicals and methylcyclohexyl radicals; aryl radicals such as the phenyl, biphenyl, naphthyl, anthryl and phenanthryl radicals; alkaryl radicals such as o-, m- or p-tolyl radicals, xylyl radicals and ethylphenyl radicals; and aralkyl radicals such as the benzyl radical and the α- and the β-phenylethyl radicals.

Examples of substituted hydrocarbon radicals R are halogenated alkyl radicals, such as the 3-chloropropyl radical, the 3,3,3-trifluoropropyl radical and the perfluorohexylethyl radical, and halogenated aryl radicals, such as the p-chlorophenyl radical and the p-chlorobenzyl radical.

Other examples of radicals R are the vinyl, allyl, methallyl, 1-propenyl, 1-butenyl and 1-pentenyl radicals, and the 5-hexenyl, butadienyl, hexadienyl, cyclopentenyl, cyclopentadienyl, cyclohexenyl, ethynyl, propargyl and 1-propynyl radicals.

The radicals R are preferably hydrogen atoms or hydrocarbon radicals having from 1 to 8 carbon atoms, particularly preferably the methyl radical.

Further preferred radicals R are alkenyl radicals having from 2 to 8 carbon atoms, particularly preferably the vinyl radical. Among unsubstituted or substituted hydrocarbon radicals having from 1 to 8 carbon atoms particular preference is given to the methyl, vinyl, phenyl or 3,3,3-trifluoropropyl radical.

It is preferable that alkyl radicals, in particular methyl radicals, be bonded to at least 70 mol % of the Si atoms present in the organopolysiloxane (A) composed of units of the formula (I). If the organopolysiloxanes contain, besides Si-bonded methyl and/or 3,3,3-trifluoropropyl radicals, Si-bonded vinyl and/or phenyl radicals, the amounts of these latter are preferably from 0.001 to 30 mol %.

The organopolysiloxanes (A) are preferably composed predominantly of diorganosiloxane units. The end groups of the organopolysiloxanes may be trialkylsiloxy groups, in particular the trimethylsiloxy radical or the dimethylvinylsiloxy radical. However, it is also possible for one or more of these alkyl groups to have been replaced by hydroxyl groups or alkoxy groups, such as methoxy or ethoxy radicals.

The organopolysiloxanes (A) may be liquids or high-viscosity substances. The organopolysiloxanes (A) preferably have a viscosity of from $10^3$ to $10^8$ mm$^2$/s at 25° C.

The crosslinking agents used in the novel silicone rubber compositions preferably comprise peroxides such as dibenzoyl peroxide, bis(2,4-dichlorobenzoyl) peroxide, dicumyl peroxide or 2,5-bis(tert-butylperoxy)-2,5-dimethylhexane, or else mixtures of these, preferably bis(2,4-dichlorobenzoyl) peroxide or 2,5-bis(tert-butylperoxy)-2,5-dimethyl-hexane. Preference is given to the use of a crosslinking agent comprising a mixture of bis(4-methylbenzoyl) peroxide (=PMBP) and 2,5-dimethyl-2,5-di-tert-butylhexane peroxide (=DHBP) in a ratio of from 1:0.4 to 0.5:1, preferably in a ratio of 1:0.4.

The organopolysiloxanes (A) according to the invention preferably also comprise reinforcing and/or nonreinforcing fillers. Examples of reinforcing fillers are pyrogenic or precipitated silicas with BET surface areas of at least 50 m²/g. The silica fillers mentioned may have hydrophilic properties or may have been hydrophobicized by known processes. Reference may be made on this point to DE 38 39 900 A (Wacker-Chemie GmbH; or to the corresponding U.S. Pat. No. 5,057,151, for example. In such cases the hydrophobicization is generally carried out using from 1 to 20% by weight of hexamethyldisilazane and/or divinyltetramethyldisilazane and from 0.5 to 5% by weight of water, based in each case on the total weight of the organopolysiloxane composition. These reagents are advantageously fed to a suitable mixing apparatus, e.g., a kneader or internal mixer, in which there is an initial charge of the organopolysiloxane (A), prior to gradual incorporation of the hydrophilic silica into the composition.

Examples of nonreinforcing fillers are powdered quartz, diatomaceous earth, calcium silicate, zirconium silicate, zeolites, metal oxide powders, such as aluminum oxide, titanium oxide, iron oxide or zinc oxide, barium silicate, barium sulfate, calcium carbonate, gypsum, and also synthetic polymer powders, such as polyacrylonitrile powder or polytetrafluoroethylene powder. The fillers used may also comprise fibrous components, such as glass fibers or synthetic polymer fibers. The BET surface area of these fillers is preferably less than 50 m²/g.

The amounts of filler (B) present in the novel organopolysiloxane compositions which can be crosslinked to give elastomers are preferably from 1 to 200 parts by weight, particularly preferably from 30 to 100 parts by weight, based in each case on 100 parts by weight of organopolysiloxane (A).

Depending on the particular application, additives (C), such as workability aids, for example plasticizers, pigments or stabilizers, e.g. heat stabilizers, may be added to the novel organopoly-siloxane compositions which can be vulcanized to give elastomers.

Examples of plasticizers which may be used as additives (C) are polydimethylsiloxanes terminated by trimethylsilyl groups or by hydroxyl groups, having a viscosity of not more than 1000 mm²/s at 25° C., diphenylsilanediol.

Examples of heat stabilizers which may be used as additives (C) are transition metal salts of fatty acids such as iron octoate, transition metal silanolates such as iron silanolate, and cerium(IV) compounds.

Each of the components used to prepare the novel compositions may be one single type of the component, or else a mixture of two or more different types of the component. The novel compositions preferably comprise no substance other than these. For example, the compositions are free of hydrophobic metal nitrides and carbides.

The silicone rubber compositions used may also be conventional condensation-crosslinking organopoly-siloxanes, as described, for example, in EP 0 359 251, which is incorporated herein by way of reference, or else known addition-crosslinking compositions.

The novel composition necessarily contains one or more metal oxides selected from the consisting of magnesium oxide, aluminum oxide, tin oxide, calcium oxide, titanium oxide and barium oxide, and/or compounds of these metals which yield oxides on heating, for example the metal hydroxides, and boric acid and zinc borate, in amounts of from 1.5 to 40% by weight, based always on the total weight of the composition, preferably from 10 to 20% by weight. Mixtures of these may also be used.

The novel compositions necessarily contain platinum complexes which have at least one unsaturated group, for example preferably platinum-olefin complexes, platinum-aldehyde complexes, platinum-ketone complexes, platinum-vinyl siloxane complexes or platinum-1,3-divinyl-1,1,3,3-tetramethyldisiloxane complexes with or without any detectable content of organic halogen; platinum-norbornadiene-methylacetonate complexes, bis(gamma-picoline)platinum dichloride, trimethylenedi-pyridineplatinum dichloride, dicyclopentadieneplatinum dichloride, (dimethylsulfoxide)(ethylene)platinum(II) dichloride, reaction products of platinum tetrachloride with olefins and with primary amines, secondary amine, or both primary and secondary amines for example the reaction product of sec-butylamine with platinum tetrachloride dissolved in 1-octene, particularly preferably the platinum-1,3-divinyl-1,1,3,3-tetramethyldisiloxane complex. The amounts of the platinum complex used are from 5 to 200 ppm, preferably from 10 to 100 ppm. The amount is based on elemental platinum. It is also possible to use mixtures of the platinum complexes.

The invention also provides a process for preparing the novel composition by mixing all of the abovementioned components.

The invention also provides cables and profiles which comprise the novel composition. The cables are preferably communications or energy cables. The profiles comprise silicone foams or compact gaskets for fire-resistant screening for rooms, cabinets or safes, or else ablation materials for lining rocket engines, etc.

Surprisingly, the present invention permits sintering to start at temperatures as low as 650° C., leading to the formation of a ceramic layer of the combustion products of silicone rubber. Thus it is possible to prepare silicone rubber mixtures with a low specific gravity (not more than 1.27), therefore having the same mechanical, electrical and heat-ageing properties as normal silicone rubber, for applications which require retention of function in the event of fire. The low density of the novel compositions results in a higher level of mechanical properties, better heat-ageing properties and greater insulating capabilities than conventional silicone rubber compositions, especially in the temperature range above 900° C. The ceramic material formed in the event of fire is moreover significantly more resistant to impact and shock than are the mixtures described in the prior art, which merely form a stable ash layer.

EXAMPLE 1

100 parts of a diorganopolysiloxane end-capped by trimethylsiloxy groups, composed of 99.93 mol percent of dimethylsiloxane units and 0.07 mol percent of vinylmethylsiloxane units and having a viscosity of $8 \cdot 10^6$ mPa·s at 25° C. are mixed in a kneader operated at 150° C., first with 50 parts of silicon dioxide produced pyrogenically in the gas phase and having a surface area of 200 m²/g, then with 1 part of dimethylpolysiloxane end-capped by trimethylsiloxy groups and having a viscosity of 96 mPa·s at 25° C., next with 7 parts of a dimethylpolysiloxane having an Si-bonded hydroxyl group in each terminal unit and having a viscosity of 40 mPa·s at 25° C., with 36 parts of aluminum oxide having a particle size >10µ and having an alkali metal oxide content of <0.5% by weight, and 0.3% by weight of a platinum-1,3-divinyl-1,1,3,3-tetramethyldisiloxane complex.

COMPARATIVE EXAMPLE 2

The method described in Example 1 is repeated, except that no platinum complex is added.

COMPARATIVE EXAMPLE 3

The method described in Example 2 is repeated except that no aluminum oxide is added.

COMPARATIVE EXAMPLE 4

The method described in Example 1 is repeated except that titanium oxide is added instead of aluminum oxide.

The composition of Example 1 and of Comparative Examples 2, 3 and 4 is used to insulate an electrical conductor (1.5 mm² wire) by extrusion. Wall thickness is 1 mm. A one-metre-long section of each of the resultant four test specimens, in the form of a stranded cable pair with a twist length of about 5 cm, is heated to 930° C. in an electrically heated tubular furnace 80 cm in length. A potential of 500 Volts alternating current is applied to one end of the twisted pair for the entire duration of the experiment. The other end is open. The experiment lasts for 2 hours.

SPECIMEN FROM EXAMPLE 1

The cable insulation ignites at about 420° C. and burns, thereby forming a solid ceramic layer. During the two hours at 930° C. the potential of 500 Volts continues to be applied without any short circuit occurring, although there is some occurrence of small cracks in the ceramic layer resulting from thermal expansion of the metallic conductor.

SPECIMEN FROM COMPARATIVE EXAMPLE 2

The cable ignites at 420° C. and burns, thereby forming a coherent ash layer but this then falls away before 930° C. is reached, and therefore the thermal expansion of the wires causes them to touch and thus create a short circuit.

SPECIMEN FROM COMPARATIVE EXAMPLE 3

The cable ignites at 420° C. and then burns, thereby forming a pulverulent ash layer which falls away as the fire continues, and shortly afterward a short circuit is created.

SPECIMEN FROM COMPARATIVE EXAMPLE 4

The cable ignites at 420° C. and burns, thereby forming a pulverulent, firmly adhering ash layer which falls away while the fire continues, and shortly afterward a short circuit is created.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A composition comprising a peroxidically crosslinking or a condensation-crosslinking silicone rubber; one or more metal oxides or metal oxide precursors selected from the group consisting of aluminum oxide, tin oxide, and compounds of magnesium, aluminum, tin, calcium, and barium which produce oxides on heating, boric acid, and zinc borate; and at least one platinum complex containing at least one unsaturated hydrocarbon group, said composition free of hydrophobic metal nitrides and carbides, and being a composition which produces a ceramic material at temperatures of 650° C. or more.

2. A composition as claimed in claim 1, wherein the platinum complex is a platinum-vinyl siloxane complex.

3. A composition as claimed in claim 2, wherein the platinum-vinyl siloxane complex is a platinum-1,3-divinyl-1,1,3,3-tetramethyldisiloxane complex.

4. The composition of claim 1 wherein said silicone rubber comprises a vinyl-functional organopolysiloxane and a hydroxyl-functional organopolysiloxane.

5. The composition of claim 1, wherein said metal oxide is aluminum oxide.

6. The composition of claim 4 wherein said metal oxide is aluminum oxide and said platinum complex is a platinum-vinyl siloxane complex.

7. The composition of claim 1, further comprising a reinforcing filler, a non-reinforcing filler, or mixture thereof.

8. The composition of claim 7 wherein said filler comprises silica.

9. A process for preparing a composition as claimed in claim 1, which comprises mixing the components.

10. A cable wherein the insulation of the conductors comprises the crosslinked composition of claim 1.

11. A cable wherein the insulation of the conductors comprises the crosslinked composition of claim 2.

12. A cable wherein the insulation of the conductors comprises the crosslinked composition of claim 5.

13. A cable wherein the insulation of the conductors comprises the crosslinked composition of claim 6.

14. A profile which comprises the crosslinked composition of claim 1.

15. A profile which comprises the crosslinked composition of claim 2.

16. A profile which comprises the crosslinked composition of claim 5.

* * * * *